United States Patent
Gourlia et al.

[11] Patent Number: 5,540,277
[45] Date of Patent: Jul. 30, 1996

[54] METHOD FOR IMPROVING HEAT AND MASS TRANSFERS TOWARD AND/OR THROUGH A WALL

[75] Inventors: Jean-Paul Gourlia, La Mulatiere; Isidore Jacubowiez, Paris, both of France

[73] Assignee: Societe Nationale Elf Aquitaine, France

[21] Appl. No.: 70,407

[22] PCT Filed: Oct. 8, 1992

[86] PCT No.: PCT/FR92/00933

§ 371 Date: Jun. 10, 1993

§ 102(e) Date: Jun. 10, 1993

[87] PCT Pub. No.: WO93/07433

PCT Pub. Date: Apr. 15, 1993

[30] Foreign Application Priority Data

Oct. 10, 1991 [FR] France .................................. 91 12477

[51] Int. Cl.6 ............................... F28D 7/00; C12M 3/00
[52] U.S. Cl. ......................... 165/164; 165/905; 165/907; 435/284.1; 435/285.1; 435/309.1
[58] Field of Search ....................... 435/285, 284, 435/311; 422/129; 165/164, 902, 905

[56] References Cited

U.S. PATENT DOCUMENTS

| | | | |
|---|---|---|---|
| 2,769,772 | 11/1956 | Gomory | 422/207 X |
| 3,170,512 | 2/1965 | Smith | 165/907 X |
| 3,359,753 | 12/1967 | Fiedler et al. | 165/907 X |
| 3,595,310 | 7/1971 | Burne et al. | 165/181 |
| 3,948,732 | 4/1976 | Haddad et al. | 435/285 |
| 4,087,327 | 5/1978 | Feder et al. | 435/287 X |
| 4,208,373 | 6/1980 | Matovich | 422/129 |
| 4,222,434 | 9/1980 | Clyde | 165/907 X |
| 4,285,385 | 8/1981 | Hayashi et al. | 165/907 X |
| 4,355,684 | 10/1982 | Caines | 165/905 X |
| 4,693,983 | 9/1987 | Davies et al. | 435/284 |
| 4,791,079 | 12/1988 | Hazbun | 502/4 |
| 4,804,628 | 2/1989 | Cracauer et al. | 435/285 X |
| 4,827,071 | 5/1989 | Hazbun | 585/443 |
| 4,852,645 | 8/1989 | Coulon et al. | 165/180 |
| 4,873,835 | 10/1989 | Rojey et al. | 62/93 |
| 4,908,315 | 3/1990 | Kertz | 435/311 X |
| 4,937,197 | 6/1990 | Wrasidlo et al. | 435/284 X |
| 4,959,322 | 9/1990 | Sakai | 435/311 |
| 4,963,490 | 10/1990 | Churchouse et al. | 435/284 X |
| 5,015,585 | 5/1991 | Robinson | 435/285 X |
| 5,028,541 | 7/1991 | Kiel et al. | 435/284 X |
| 5,079,168 | 1/1992 | Amiot | 435/311 X |
| 5,089,122 | 2/1992 | Chmiel | 210/185 |
| 5,141,720 | 8/1992 | Malmstrom et al. | 165/907 X |

FOREIGN PATENT DOCUMENTS

| | | |
|---|---|---|
| 2429988 | 1/1980 | France . |
| 1246581 | 9/1971 | United Kingdom . |

*Primary Examiner*—Leonard R. Leo
*Attorney, Agent, or Firm*—Bacon & Thomas

[57] ABSTRACT

The invention relates to a method for improving heat and mass transfers to and/or through a wall, and if need be, to such a method applied to a permeable wall. The invention also concerns a wall and conductive material pair having improved heat and mass transfer characteristics. The method of the invention is useful for all techniques requiring both heat transfer and flow of gaseous phase to or through a wall.

11 Claims, 1 Drawing Sheet

METHOD FOR IMPROVING HEAT AND MASS TRANSFERS TOWARD AND/OR THROUGH A WALL

TECHNICAL FIELD OF THE INVENTION

The present invention relates to a method for improving heat and mass transfers towards and/or through a wall and, if appropriate, to such a method intended to be used with a permeable wall. The present invention also relates to a pair consisting of a wall and of a conducting material having improved heat and mass transfer characteristics.

Certain chemical or physicochemical techniques require the transit of a gas towards a wall separating the operating space into two regions, in which wall the temperature must additionally be controlled, by introduction or extraction of heat, in order to make it possible or easy to use these techniques which could, for example, involve passing the said gas from one region to the other through the wall. The wall can thus define an open or closed region constituting a medium containing one or a number of gaseous, liquid or solid materials, the said medium being stationary or non-stationary.

Thus, the problem is posed of maintaining the temperature of the wall, for example by heating, constant over all its useful surface while providing free passage of the gas towards the wall.

There are also problems with heat exchangers in which the exchange is carried out via an impermeable conducting wall which separates two fluids, one at least of which is in the gaseous state. In effect, in this type of exchanger, the heat transfer coefficient between the gaseous fluid and the wall, and consequently the other fluid, is very low.

In current methods or devices, it is possible either to improve the heat transfer towards a wall by depositing, on the latter, a good thermally conducting material which has the associated disadvantage of preventing the free circulation of the gas in the vicinity of the wall, or of promoting the passage of the gas by freeing the wall of all obstacles, in which case the heat transfer is reduced and additionally very badly controlled.

SUMMARY OF THE INVENTION

The subject of the present invention is to overcome these disadvantages by proposing a method which makes it possible to provide both transit of the gas towards the wall and the heat transfer.

The subject of the present invention is a method for improving transfers of heat and of material in gaseous form, in the vicinity of a wall separating an operating space into two regions, characterised in that there is attached to the said wall, on at least one of its faces, a porous solid phase having a high thermal conductivity which carries the gaseous effluent, under the action of a flow, into contact with the wall and transmits, to the wall, the heat supplied by a thermal source.

The method of the invention applies as much to the processes involving a transfer of materials from one region to the other through the said wall, which will then have a certain permeability, as to the processes in which there will simply be a heat transfer between the two regions, the wall then being impermeable.

In an embodiment variant, the method is implemented in an operating space separated by a permeable wall into two regions, one of which is the site of a chemical or physicochemical reaction; at least one of the faces of the said wall, especially that which is on the side of the region containing the heat source, is attached to a conducting porous solid phase which will carry the gaseous effluent to the vicinity of the wall and will transmit the heat arising from the source. This method will make it possible to precisely control the temperature of the wall and thus to control both the temperature conditions of the chemical or physicochemical reaction and the amounts of gas to be transferred from one region to the other of the operating space.

Permeable wall is understood to mean a wall capable of allowing compounds in the gaseous phase to pass under certain conditions of temperature and pressure. This property, denoted by the name of permeability, is modified by a temperature variation and can, under certain conditions, become virtually zero.

There will be used, according to the precise application of the method, walls whose permeability will vary in a substantially linear way as a function of the temperature or walls having sudden permeability variations linked to temperature variations.

The invention also relates to a wall/conducting material pair comprising a wall to which, in order to improve mass and heat transfer towards and/or through the wall, a porous solid phase having a high thermal conductivity is attached.

The permeable walls used in the method of the invention are of the organic or inorganic membrane type used in separation, gaseous fluid diffusion or catalytic reaction processes.

They could be dense membranes, that is to say membranes providing material transfer by dissolution of the compound to be transferred in the material of the wall, then diffusion and finally expanding out. They could also be porous membranes, that is to say membranes providing transfer through their pores.

By way of examples of organic membranes which can be used in the method of the invention, there may be mentioned polymeric compounds such as cellulose compounds, especially acetates, polyacrylonitrile, silicone rubber, polycarbonate-rubber-silicone copolymers, polytetrafluoroethylene, poly(vinyl chloride), polysulphones, polyamides, poly(vinyl acetate)s, polycarbonates, polyphosphazenes, and the like.

By way of examples of inorganic membranes, there may be mentioned alumina or ceramics based on alumina, on zirconium oxide or on titanium oxide, silica, silica-based glasses made porous, if appropriate, by an acid-based treatment, sintered metals, for example nickel or a stainless steel, dense metals such as palladium or its alloys, or silver, and the like.

These membranes could, if appropriate, be deposited on a sintered support providing mechanical strength.

The size of the pores of the porous inorganic membranes is generally between 10 and 2000 Å.

In the method of the invention, the wall is attached to a porous solid phase which comprises expanded graphite which is advantageously recompressed to substantially reduce its volume and to improve its conductivity.

By virtue of its low density, which is between 0.001 and 1.5, the expanded graphite remains extremely porous and thus makes possible the free passage of a gas while providing good thermal conductivity linked to the nature of the graphite.

According to a specific aspect of the invention, expanded graphite is used, recompressed so that it has anisotropic heat transfer properties, which will be particularly advantageous for efficiently controlling the temperature level of the wall. Its density will then be between 0.02 and 1.5. Its thermal conductivity will generally be between 0.5 and 30 W/m/K.

The recompressed expanded graphite has a coefficient of anisotropy generally of between 5 and 150. This coefficient is determined by the ratio of the thermal conductivity of the graphite measured along a direction D1 to the thermal conductivity of the graphite measured along a direction D2 perpendicular to the direction D1.

The amount of expanded graphite used will depend mainly on the distance from the heat source whose transfer it has to provide.

The present invention also finds its use in improving heat exchanges between two fluids, one at least of which is in the gaseous state, separated by an impermeable conducting metal wall. In this type of application, two fluids having different thermal levels are caused to come into contact with the opposite faces of a wall in order to exchange heat there. The coefficient of transfer between a turbulent gas and a metal wall is low, usually between 10 and 40 W/m$^2$/°C. and ranging, in certain cases, up to 80 W/m$^2$/°C.

In another variant of the method, the subject of the present invention is to improve heat transfer between a fluid and a conducting metal wall by attaching, to at least one of the faces of the wall on the side of the gaseous fluid, a porous solid phase having a high thermal conductivity. With such a system, the heat transfer coefficient can reach 300 W/m$^2$/°C.

The porous solid will make it possible to considerably increase the active surface for exchange between the gaseous fluid and the metal wall where transfer takes place.

In the case where the exchange relates to two gaseous fluids, it will be advantageous to deposit the conducting porous solid on each face of the wall.

The walls used in this variant of the method are metal walls which are conventional in this type of exchanger.

The conducting porous solid used will advantageously be the recompressed expanded graphite described above, a degree of recompression being chosen which produces a solid having a porosity sufficient to provide the gaseous effluent with a pressure drop compatible with this type of thermal exchange technique.

Other characteristics and advantages of the present invention will become more clearly apparent on reading the description of the examples of devices and methods below, made with reference to the appended drawings:

DETAILED DESCRIPTION OF THE INVENTION

Figure 1:
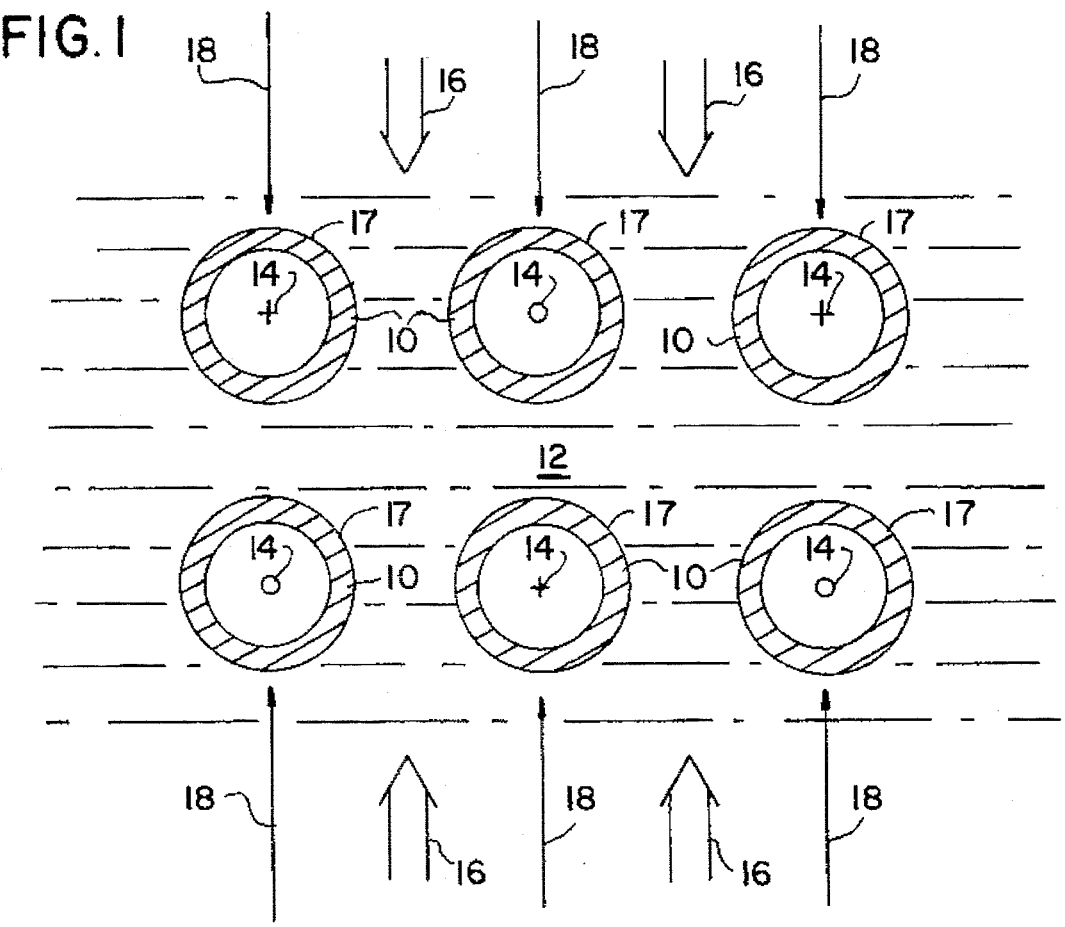
FIG. 1 is a schematic sectional view of an assembly of wall/porous solid phase pairs which can be used for the implementation of the method of the invention.

As represented in FIG. 1, pipes 10, six in the example illustrated, of circular cross-section, defined by walls 17 of membrane type, are arranged in an orderly way in a porous solid 12 which, in the example illustrated, is of recompressed expanded graphite. A fluid passes inside pipes 10 either in a parallel fashion or, in the example illustrated, in alternate directions as represented by the arrows 14. Heat emanating from a source which is not shown, arrives in the expanded graphite as represented schematically by arrows 16. Gas, arising from a source which is not shown, moves inside the porous graphite towards the walls 17 of the pipes 10 as shown schematically by the arrows 18 and, by virtue of a pressure difference between the phase 12 and the fluid phase present in the pipes 10, passes through the wall of the tubes. The amount of gas passing through the wall depends, under identical pressure conditions, on the temperature applied to the wall via heat conveyed according to the arrows 16.

The assembly in FIG. 1 finds its use in processes where the aim is to introduce a gas into a space situated beyond a wall in order to make it react, whether chemically or physically, with a fluid moving inside the pipes and where the temperature level of the wall has an influence on the implementation of the process.

EXAMPLE 1

By way of example of a method capable of using the subject of the invention, there may be mentioned partial oxidation reactions of hydrocarbons. In effect, these reactions have three main characteristics:

their high exothermicity, which can bring about reaction runaway, yields always reduced by complete oxidation reactions, essential control of the amounts of oxygen present in the medium in order to minimise side reactions.

This is the reason why it has already been proposed to use membrane methods which enable the oxygen required for the reaction to be introduced along the whole length of the reactor.

The use, in this type of method, of the membrane wall/ conducting porous solid pair according to the invention makes it possible, on the one hand, to extract the heat of the reaction and, on the other hand, to control the injection of oxygen by regulating the temperature of the wall.

EXAMPLE 2

The method of the invention can be used in a wide range of chemical methods which involve a mass transfer in the gaseous state and a control of the temperature of the medium by heat transfer.

The method for dehydrogenation of ethylbenzene to styrene is another example of the use of the method according to the invention.

The dehydrogenation reaction of ethylbenzene to styrene is an endothermic catalytic reaction. To increase the conversion, it is advantageous, on the one hand, to increase the temperature and, on the other hand, to draw off the hydrogen produced as it is formed. This extraction can be carried out using an inorganic membrane whose pore size is adjusted to allow hydrogen to pass selectively.

If, in the process used, no heat is introduced, the temperature of the reaction mixture falls very quickly. This decrease thus limits the overall conversion. By attaching the conducting porous solid to the membrane wall, it will be possible to make the membrane reactor isothermal. Simultaneously, the rate of transfer of hydrogen through the membrane will be controlled to the extent that the flow is proportional to <T, T being the temperature of the membrane.

EXAMPLE 3

The example below illustrates the advantage of regulating the wall temperature in a process for separation by membrane.

In a conventional device consisting of two chambers separated by a microporous inorganic membrane made of alumina, the pores of which, of the order of 1000 Å, are filled with n-hexadecane, a mixture of the following composition by volume is treated under nominal operating conditions (20° C.):

Inerts: 2.7%; $CH_4$: 90.8%; $C_2H_6$: 4.9%;
$C_3H_8$: 1.19%; $i-C_4H_{10}$: 0.26%; $n-C_4H_{10}$: 0.15%

Under these nominal conditions, the permeability (p) and the selectivity with respect to methane obtained for the components of the mixtures with the membrane used are specified in Table 1 below.

TABLE 1

| components | $p(m^3 \cdot m/m^2 \cdot s \cdot Pa)$ | selectivity |
|---|---|---|
| $CH_4$ | 0.24 | 1 |
| $C_2H_6$ | 0.9 | 3.8 |
| $C_3H_8$ | 2.7 | 11.3 |
| $i-C_4H_{10}$ | 5.0 | 20.6 |
| $n-C_4H_{10}$ | 9.0 | 37.5 |

The same operation is carried out using the same device, the injection chamber of the mixture being equipped with a layer of recompressed expanded graphite of density [lacuna] attached to the wall and connected to a heat source which makes it possible to provide heating of the wall in order to raise the temperature to 100° C.

The results obtained under these conditions are shown in Table 2 below.

TABLE 2

| components | permeability | selectivity |
|---|---|---|
| $CH_4$ | 0.49 | 1 |
| $C_2H_6$ | 1.14 | 2.32 |
| $C_3H_9$ | 2.28 | 4.65 |
| $i-C_4H_{10}$ | 3.34 | 6.81 |
| $n-C_4H_{10}$ | 5.34 | 10.9 |

It can be observed that under these conditions the permeability of the light gases is increased (doubly so for methane) to the detriment of the heavy compounds.

Adjustment of the temperature of the wall makes it possible to control the permeability, and thus the flow, and the selectivity.

EXAMPLE 4

Figure 2:
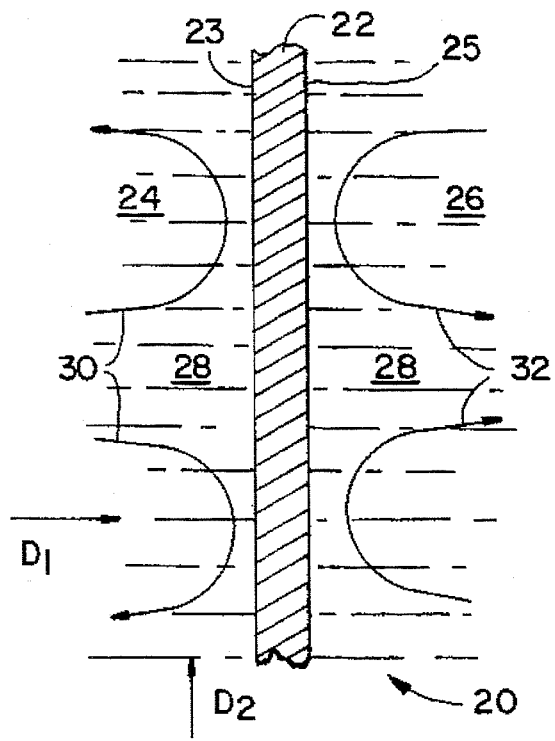
FIG. 2 is a schematic sectional view of a pair consisting of a wall and of a conducting material according to another embodiment of the invention.

There is represented, in FIG. 2, a heat exchanger 20 formed from an impermeable wall 22 which, in the example illustrated, is planar, separating two fluid phases 24 and 26 of which at least one 24 is in the gaseous state. A porous solid phase 28 having a high thermal conductivity is attached to at least the face 23 of the wall 22 on the side of the gaseous fluid 24. In the example illustrated, where the two fluids 24 and 26 are in the gaseous state, the porous solid phase 28 is attached to both sides of the wall 22 on the faces 23 and 25. The two gaseous fluids 24 and 26 are caused to move in the porous solid phase 28 as shown schematically by the arrows 30 and 32.

The porous solid phase 28 comprises recompressed expanded graphite having a density between 0.02 and 1.5. Preferably, the recompressed expanded graphite has, as a result of its recompression, anisotropic thermal conductivity characteristics. Thus, the thermal conductivity in the direction D, normal to the surface of the wall 22, is markedly more significant than that in a direction D2 parallel to the wall.

The heat transfer coefficient of the gaseous fluid 24, 26 to the wall is brought, by virtue of the invention, to a value between 200 and 300 $W/m^2/°C$. In order to achieve an optimum transfer coefficient, the density of the anisotropic recompressed expanded graphite is of the order of 0.2 to 0.4 with a porosity of 0.9 to 0.82.

In certain types of heat exchangers, the wall 22 can have a tubular shape.

The method of the invention can naturally be used in any physicochemical technique requiring both heat transfer and free circulation of a gaseous phase towards and/or through a wall.

In addition to the examples described above, there may be mentioned, in a non-limiting way, the practical applications below:

- Aeration or oxygenation of a liquid or a gas.
- Halogenation reaction of hydrocarbon compounds.
- Gas separation through a porous or semi-permeable membrane/wall, or membrane/wall of permeability according to temperature: wall having selective permeability; filters.
- Devices intended for distributing/releasing a gas through a porous wall at a given temperature, either for producing a mixture or for storing the gas in an enclosure within which it is trapped by temperature variation.

We claim:

1. Method for improving transfers of heat and of material in gaseous form, in the vicinity of a permeable wall separating an operating space into two regions, comprising attaching to said permeable wall a porous solid phase which carries a gaseous effluent, under the action of a flow, into contact with the wall and transmits to and through the wall heat supplied by a thermal source, said porous solid phase being attached at least to the face of the permeable wall directed towards said thermal source and consisting of at least partially recompressed expanded graphite having a density between 0.001 and 1.5 and a thermal conductivity between 0.5 and 20 w/m/K, whereby there is controlled passage of the gaseous effluent from one region to the other.

2. Method according to claim 1, wherein the wall is an organic membrane.

3. Method according to claim 1, wherein the wall is an inorganic membrane.

4. Method according to claim 1, wherein the graphite has anisotropic heat transfer characteristics.

5. Wall/conducting material pair comprising a permeable wall to which a porous solid phase and consisting of at least partially recompressed expanded graphite having a density between 0.001 and 1.5 and a thermal conductivity between 0.5 and 20 w/m/K is attached in order to improve mass and heat transfer of a gaseous effluent towards and through the permeable wall.

6. Pair according to claim 5, wherein the wall is tubular.

7. Pair according to claim 5, wherein wall comprises an organic membrane.

8. Pair according to claim 5, wherein the wall comprises an inorganic membrane.

9. Pair according to claim 8, wherein the wall contains pores whose size is between 10 and 2000 Å.

10. Pair according to claim 5, wherein the porous solid phase comprises expanded graphite having a density between 0.001 and 0.02.

11. Pair according to claim 5, wherein the expanded graphite has anisotropic heat transfer characteristics.

* * * * *